(12) United States Patent
Douglas-Hamilton et al.

(10) Patent No.: US 6,445,451 B1
(45) Date of Patent: Sep. 3, 2002

(54) COLORIMETER AND ASSAY DEVICE

(75) Inventors: Diarmaid H. Douglas-Hamilton, Beverly; Thomas G. Kenny, Woburn, both of MA (US)

(73) Assignee: Hamilton Thorne Research, Beverly, MA (US)

( * ) Notice: Subject to any disclaimer, the term of this patent is extended or adjusted under 35 U.S.C. 154(b) by 0 days.

(21) Appl. No.: 09/249,943

(22) Filed: Feb. 12, 1999

Related U.S. Application Data

(63) Continuation-in-part of application No. 09/022,605, filed on Feb. 12, 1998, now abandoned.

(51) Int. Cl.$^7$ ................................................ H04J 15/00
(52) U.S. Cl. ........................ 356/425; 356/73; 356/319; 356/407; 356/408
(58) Field of Search .................... 356/319, 300, 356/402, 407, 408, 425, 244, 246

(56) References Cited

U.S. PATENT DOCUMENTS

| | | | | |
|---|---|---|---|---|
| 4,201,479 A | * | 5/1980 | Lardon | 356/445 |
| 4,354,742 A | * | 10/1982 | Abel et al. | 350/442 |
| 4,439,012 A | * | 3/1984 | Christy | 350/294 |
| 4,601,578 A | | 7/1986 | Woolhouse et al. | 356/338 |
| 4,603,976 A | * | 8/1986 | Fetzer et al. | 356/402 |
| 4,952,817 A | * | 8/1990 | Bolan et al. | 356/319 |
| 5,059,025 A | * | 10/1991 | Ando | 356/319 |
| 5,116,125 A | | 5/1992 | Rigler | 356/343 |
| 5,181,145 A | * | 1/1993 | Eden | 359/859 |
| 5,433,197 A | | 7/1995 | Stark | 128/633 |
| 5,598,842 A | * | 2/1997 | Ishihara et al. | 356/39 |
| 5,691,486 A | | 11/1997 | Behringer et al. | 73/863.73 |
| 5,764,183 A | * | 6/1998 | Vergona | 347/232 |

OTHER PUBLICATIONS

Catherin M. Marquette, et al., "Vasectomy in the United States, 1991", American Journal of Public Health, May 1995, vol. 85 No. 5.
Brotherton, J., 1988, Andrologia 20:33–43.
Schirren, S. et al., 1988, Andrologia 20:44–47.

* cited by examiner

Primary Examiner—Frank G. Font
Assistant Examiner—Roy M. Punnoose
(74) Attorney, Agent, or Firm—Rashida A. Karmali

(57) ABSTRACT

A cassette reader for detecting the status of stained samples is provided. The colorimeter includes one or more high power emitting diodes as the source of illuminating the sample. An elliptical mirror, with a central aperture to permit the light to penetrate on to the sample, directs the scattered light on to its focal point at a detector. The colorimeter includes a microprocessor which compares an output signal for the percent ratio value of the detected values of a sample and a standard sample. The colorimeter housing provides position sensors which allow the identification of the well being examined. Finally, the system is modified to measure cell motility by determining the ratio of motile sperms to total cell concentration.

6 Claims, 12 Drawing Sheets

COLORIMETER AND ASSAY DEVICE

CROSS-REFERENCE TO RELATED APPLICATIONS

This Application is a Continuation-In-Part of U.S. patent application Ser. No. 09/022,605, filed Feb. 12, 1998 now abandoned.

BACKGROUND OF THE INVENTION

The present invention relates generally to a cassette reader and, more specifically, to a colorimeter for detecting the status of stained and/or unstained samples, to quantify changes in sperm cell color density and motility.

Colorimeters are generally used to characterize the color of an object by providing diffuse illumination which is reflected or transmitted by the object and is transmitted optically to a dispersing element. The dispersing element disperses the coherent light spectrally. A normal colorimetry is effected by using a spectrophotometer. However, the spectrophotometer is a large and expensive apparatus, which can not be readily used in general and does not facilitate use outside a laboratory environment for determining the status of stained samples such as biological specimens.

Another problem associated with calorimeters is that as the illuminating lamps used in such colorimeters (for example the halogen lamps) age, the color and intensity of light produced by the lamp can change. This in turn, causes the color signature of a sensed object to vary with the age of the lamp. A possible solution to the problem of lamp aging is frequent recalibration of the colorimeter. However, this is only feasible in the laboratory environment and frequent recalibration increases the cost of assaying samples.

Bolan et al., U.S. Pat. No. 4,952,817, issued Aug. 28, 1990, describes a self-starting test station controlled by a microprocessor and includes a slot guiding a strip carrying a sample. The essential feature of the Bolan patent is that it is always "ready", and turns on only when it senses a test sample inserted. It is battery powered, with a battery powered computer. The power is normally off, there is no power to the microprocessor and negligible power elsewhere. Bolan's invention is directed at blood sugar monitoring for diabetics. A separate calibration stick measures the blood sugar content. The disadvantage of this system is that by having a separate calibration stick, the analysis of each sample is open to error. The present invention increases the accuracy by providing the calibration on the cassette so that each measurement is made with a built-in scale on each cassette.

Stark, E. W., U.S. Pat. No. 5,433,197, issued Jul. 18, 1995 describes an apparatus to measure glucose in the eye. This depends on transmission of light through the eye. The disadvantage is that it requires use of a diffraction grating in either the out-put light or the light analyzing sections to give narrow light beams. It uses infra-red illumination exclusively and obtains an absorption spectrum. Therefore, the unit cannot measure the reflected intensity of a cassette. The present invention uses only visible illumination and therefore integrates the absorption without requiring spectral measurement.

Heretofore, the analysis of biological, industrial and medical specimens has been accomplished by determining the concentration of a dye or dyed cells in a specimen by conventional colorimetry. This method of color differentiation suffers from several drawbacks. The process is slow and cumbersome, requires costly equipment which needs frequent calibration in a laboratory environment and is unsuitable for use in other environments such as a doctor's office or even an industrial environment.

By way of example, over 11 million semen analyses are performed annually worldwide, many of them in clinical practices that can not afford fully automated semen analysis systems or colorimeters. The most important features of the semen analysis systems are determination of sperm concentration, motility, viability, white cell count, morphology and acrosome reactions. A semen analysis may be performed for a variety of reasons, including not only suspected infertility, but quality controls for sperm banks, male contraceptive research and post vasectomy checks for sperm counts. In the U.S., 500,000 vasectomies are performed per year, and in China and India, the total exceeds 3.5 million annually (Marquette, C. M. et al., 1995, Am. J. Public Health 85: 644–649). Two to three follow-up tests are recommended in the weeks after surgery to ensure that no live sperm are left in the system.

At present, semen is examined either visually by trained observers or with an automated semen analysis system. The World Health Organization guidelines for semen analysis require numerical information on semen criteria such as sperm concentration and counts, motility, viability, morphology and presence of leukocytes in order to determine the course of treatment for infertility. In some countries, for example, Germany, the cost of yes/no tests is not reimbursable. Only cost of tests producing results having a numerical read-out is reimbursed. In consequence, sperm cells are counted in a hemacytometer, viability determined by further staining and counting on a slide and morphology determined by trained technicians. It is therefore desirable to have an inexpensive simple method to cut costs while producing numerical measurements of semen criteria. There is a need for an inexpensive, accurate method for determining key elements, including quantifying sperm counts, in male fertility assessments.

In addition, there is a need to more inexpensively measure sperm motility in male fertility assessments. Previous attempts to use optical scattering and laser Doppler shift to measure sperm motion and concentration have met with limited success (Brotherton J., 1988, Andrologia 20:33–43; Schirren, S. et al., 1988, Andrologia 20:44–47). These approaches used high concentrations of sperm in relatively deep chambers and relied on statistical properties of large numbers of sperm. Woolhouse, J. K. et al., U.S. Pat. No. 4,601,578, issued Jul. 22, 1986, (abandoned) discovered that laser light scattered from a semen sample contains information indicative of the motility of the sperm contained in the sample, not by virtue of the moving sperm causing Doppler Shifts in the light frequency but by virtue of the flat sperm heads simulating mirrors which rotate at a rate proportional to sperm beat frequency. The laser light scattered from a sperm sample was subjected to Fourier analysis in an attempt to derive both the motile and static sperm concentrations. However, in order to evaluate the signal spectrum the output signal had to be split into two frequency bands and integrated the signals with respect to time to provide a reasonable measure of the amplitude. Moreover, such an integration technique requires an accurately determined average or DC signal level which posed a significant problem requiring use of a high pass master filter. Rigler, R. U.S. Pat. No. 5,116,125, issued May 26, 1992, described a method to measure laser scattering from a sample in a cylindrical capillary tube. The disadvantage of this method is that the method requires equipment which is very expensive, non-portable and provides more information than is needed for routine work associated with male fertility assessments.

The present assays are based on staining sperm cell nuclei, acrosomes and leukocyte cytoplasm in order to detect only the stained cells rather than both cells and detritus. A new method of determining cell motility is also developed using a focused laser beam which measures swimming sperms by laser light scattering and provides a ratio of motile to total cell density of the specimen. Trends in medical cost containment are driving the need for low cost rapid diagnostics simple enough to be used in the general practitioner's office. Accordingly, it is desired to provide a calorimeter for determining sample characteristics that is inexpensive and suitable for automatic quantification of semen (or other tested sample) properties.

SUMMARY OF THE INVENTION

In accordance with the instant invention, a cassette reader or male assessment of reproductive quality (MARQ) reader measures the intensity of a light beam reflected off a stained test specimen. The calorimeter includes a housing. Two or more high power light emitting diodes are disposed within the housing for shining light along a light path to the sample. A detector detects light reflected from the sample. A microprocessor receives the reflected light and determines the characteristic of the specimen based thereon, and reports the result(s) on a display.

The housing is provided with a cover having a guiding slot and a plurality of position detectors which detect the position of a sample holder member when the sampler holder is placed within the guiding slot. A mirror assembly for maximizing light transmitted to the sample is disposed between the light source and samples.

Accordingly, it is an object of the invention to provide a cassette reader which is simple to operate and which better maintains its accuracy over time.

Another object of the invention is to provide a cassette reader adapted to assay the male assessment of reproduction quality (MARQ) in testing male fertility.

Another object of the invention is to provide a cassette reader which selectively provides a plurality of position detectors which detects the position of a sample holder member within the card reader.

Another object of the invention is to provide a cassette reader having high power light emitting diodes in the color regions appropriate for measurement of the visual stain on the test specimen.

Another object of the invention is to provide a cassette reader having high power light emitting diodes in the color regions appropriate for measurement of the unstained test specimen.

Another object of the invention is to provide a cassette reader which permits the illuminating light to penetrate on to the sample while directing the scattered light on to its focal point at the detector.

Still another object of the invention is to provide a cassette reader having a lens which further maximizes the surface reflection of the incident illuminating beam on to the detector.

Another object of the invention is to provide a cassette reader which permits accurate determination of motile cells in a sperm specimen.

Still another object of the invention is to provide a cassette which is arranged to hold a small microscope slide of fixed chamber depth.

Another object of the invention is to provide a cassette reader having laser illumination which is focused by a condensing lens on to a sample chamber.

Another object of the invention is to provide a cassette reader having a sensing means including an apertured-mirror optical system to determine light scattering by a motile sperm.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with accompanying drawings in which.

DETAILED DESCRIPTION OF THE PREFERRED EMBODIMENTS

The term "apertured-mirror" as used herein represents a mirror with an opening of a suitable size, made through it.

Figure 1:
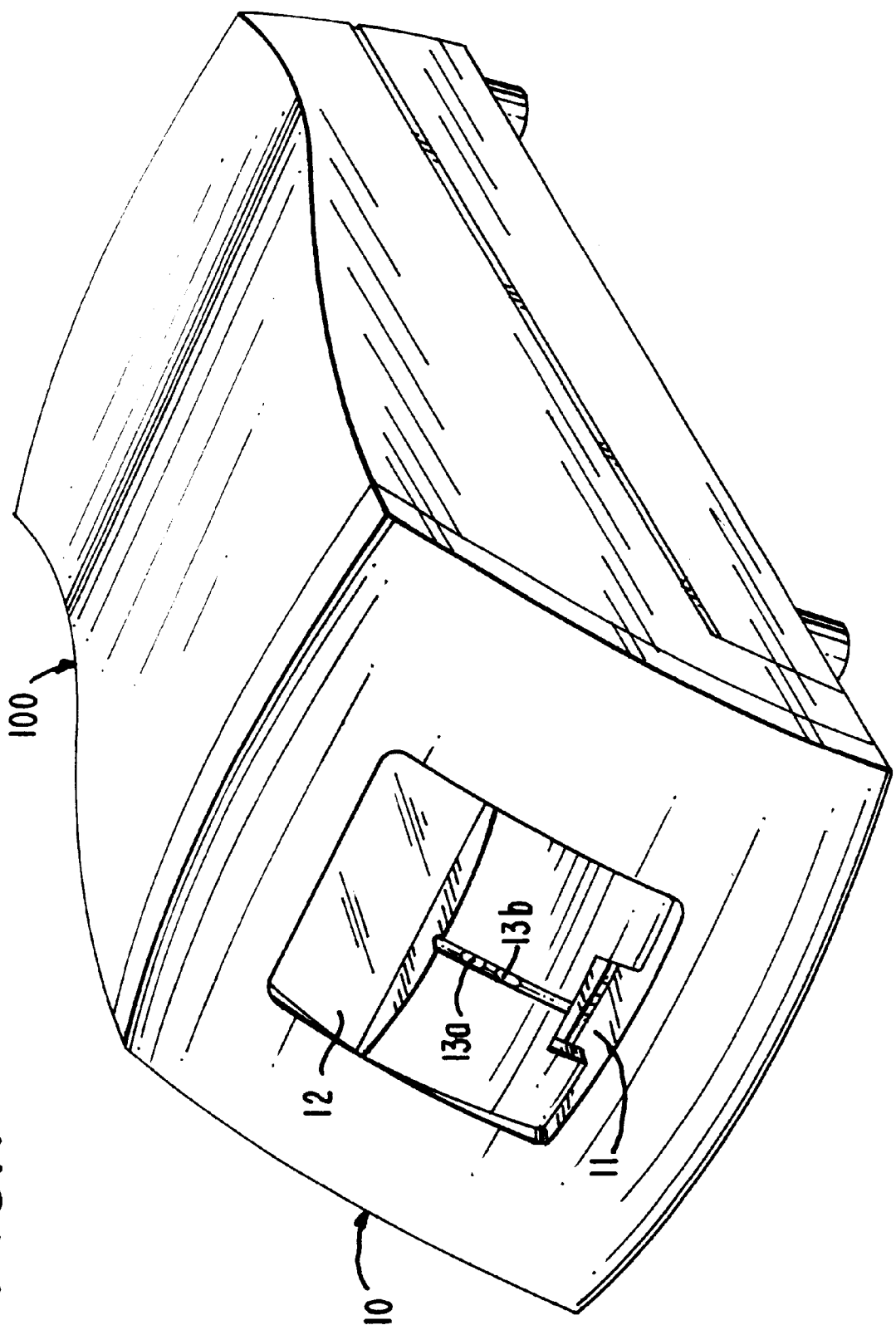
FIG. 1 is a perspective exploded view of a prototype cassette reader housing constructed in accordance with the present invention.

Reference is made to FIG. 1 wherein a calorimeter MARQ reader, generally indicated as 10, constructed in accordance with the invention is shown. While the present invention is particularly suited for analyzing MARQ, it is to be understood that the invention is equally applicable to analyzing color changes produced in specimens tested in immunoassays, in paints, at solid surfaces such as paper and plastics, in liquids, dyed fabrics and textiles, and in natural materials such as leather and wool. The colorimeter of the present invention performs accurate color measurements for any self luminous body and for any light issued from a body illuminated by a separate illuminating source, A specimen holder or cassette 14 is utilized in conjunction with the colorimeter card reader 10, FIG. 2.

Generally, specimen holder 14 includes a base member 25. A plurality of specimen wells 16a to 16d are formed in the base member 25 in a longitudinal direction. A plurality of notches 15a to 15d formed in the edge of the base member correspond to a respective well 16a to 16d. During use two well positions 16a and 16b have standard dye and a no-dye sample, giving standard signal and fill scale signal respectively. The third and fourth wells 16c and 16d contain actual test specimens.

Figure 4:
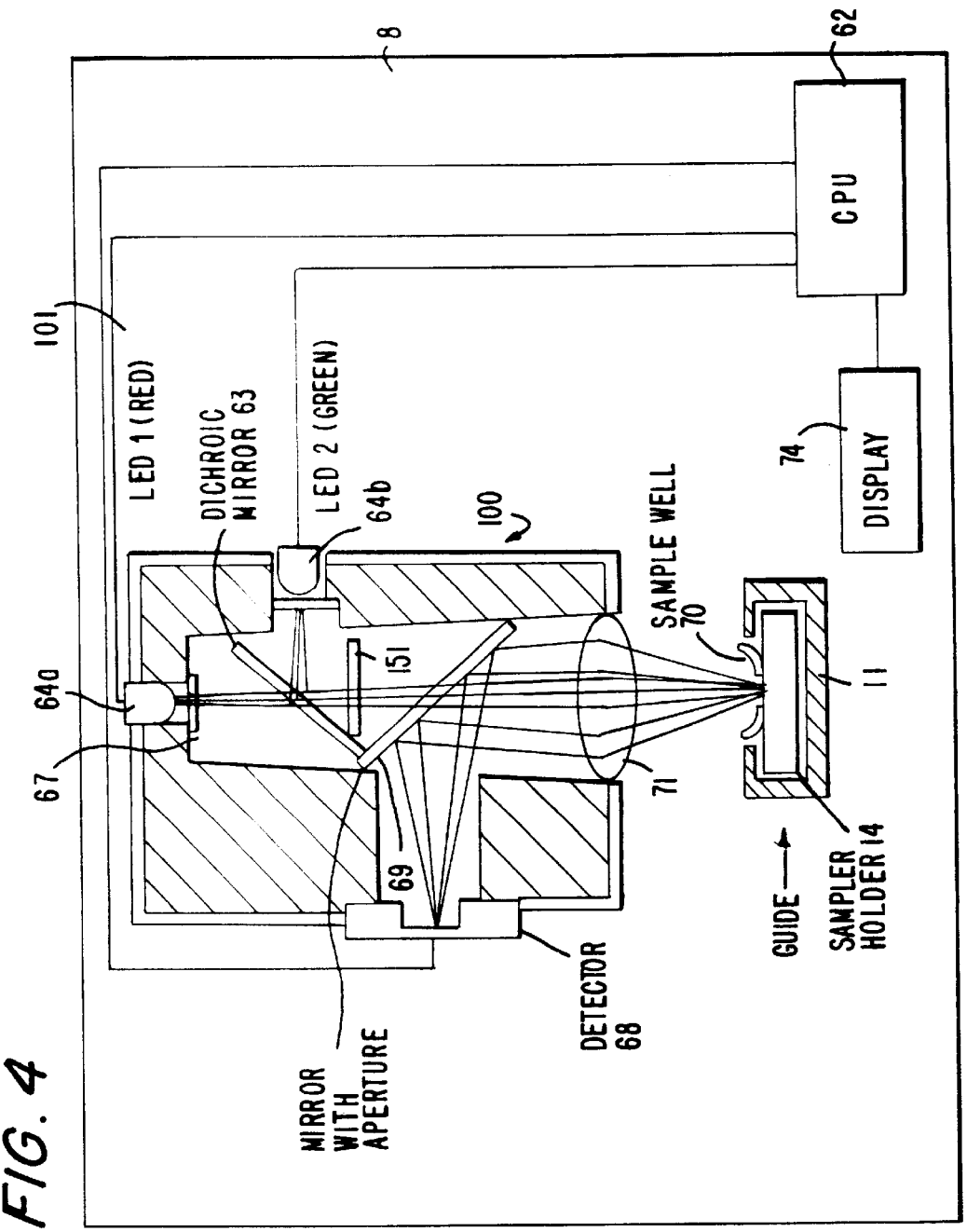
FIG. 4 is a block schematic diagram of the calorimeter analyzing a sample.

A colorimeter housing 100 includes a guiding slot 11 including a ball and spring index for receiving a sample holder 14. As shown in FIG. 4, colorimeter card reader 10 includes a housing 100. An optical tube 67 forms a light pathway within housing 100. In the present embodiment, detector 68 and two light sources 64a and 64b are disposed along axial tube 67. More light sources may be added up steam LED 64b, with appropriate dichroic mirrors added up stream mirror 63.

A mirror assembly 101 includes mirror 63 disposed in optical tube 67 to allow light of a first wavelength to pass towards a sample 70 within housing 100, while reflecting light of a second wavelength (source 64b) to pass towards sample 70. Mirror assembly 101 includes a second mirror 69, eliptical in shape and disposed in tube 67, down stream along the light path from mirror 63, having an aperture in its center to allow light to pass through mirror 69 towards sample 70 and, direct the scattered light reflected from sample 70 onto its focal point at the detector 68. An aperture 151 member up stream along the light path from mirror 69 prevent scattering of light from mirror 69 on to the detector 68.

A lens 71 disposed between mirror assembly 101 (mirrors 63 and 69, and member 151) and sample 70 focuses the emitted light onto sample 70. By using an appropriately coated lens 71, and the aperture of the mirror 69, surface reflection of the incident beam is minimized. Moreover, specular reflection from specimen 70 does not reach detector 68.

As shown in FIG. 4, the specific embodiment of the colorimetric reader also includes a microprocessor CPU/A/D converter 62 (e.g. PIC 16c74, Microchip, 10–20 Mhz) for controlling optical components 64a, 64b and 68. Lighting sources 64a and 64b are coupled to CPU 62, which causes LEDs 64a and 64b to illuminate sample 70. The light from LEDs 64a and 64b passes through mirror assembly 101 where it is focused through lens 71 and hits sample 70. Light is then reflected from or absorbed by sample 70, as a function of the color of sample 70. Light then passes through lens 71 and is reflected onto detector 68. Detector 68 detects the intensity of reflected light and produces a signal corresponding thereto, which is transmitted to the A/D converter of CPU 62. CPU 62 determines characteristics of the sample based on the signal from detector 68. A display 74, controlled by CPU 62 then displays the results.

Figure 5:
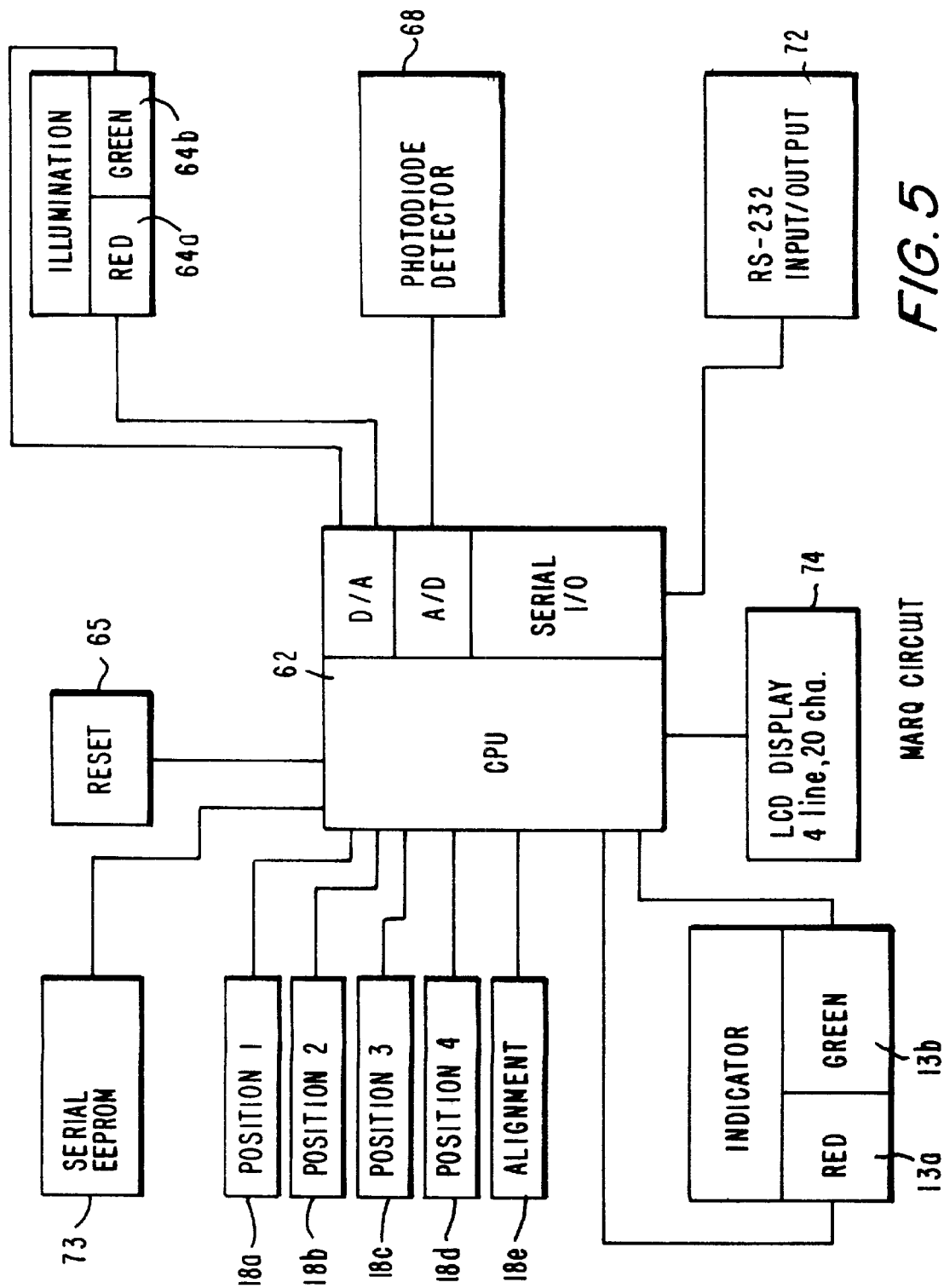
FIG. 5 is a block diagram of calorimeter.

Referring specifically to FIG. 5, which illustrates the circuitry associated with CPU 62 with greater particularity, CPU 62 is coupled to LEDs 64a, 64b through a digital to analog converter. In the preferred embodiment, LED 64a is red and LED 64b is green.

Figure 2:
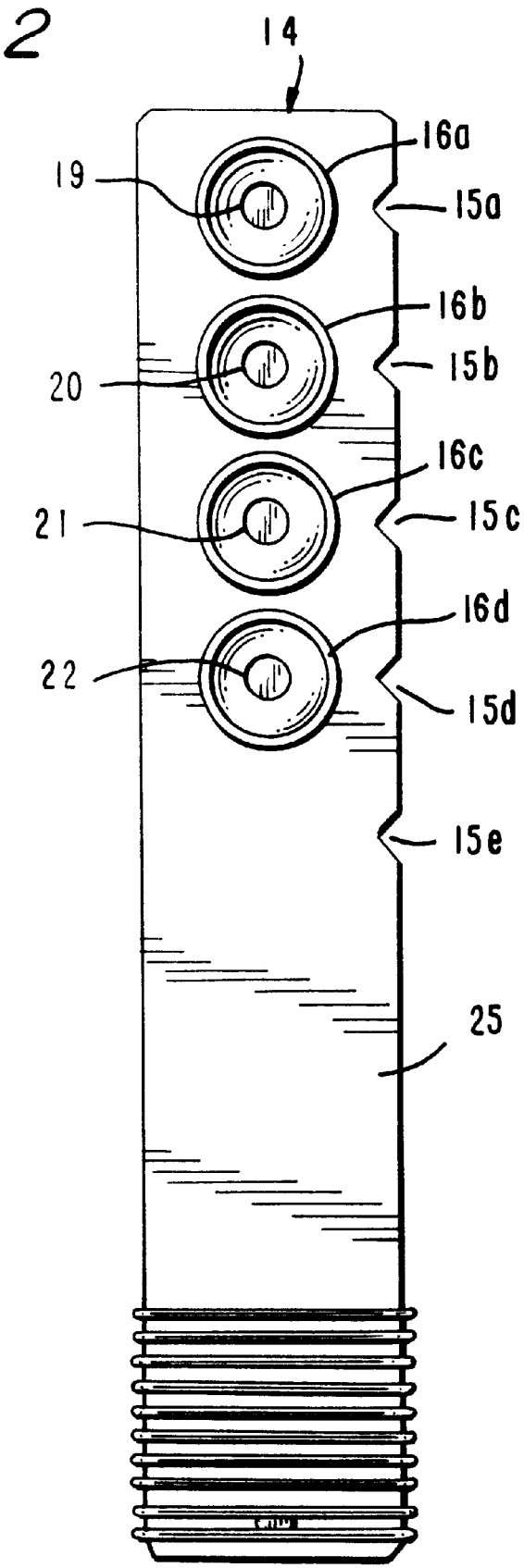
FIG. 2 is a top plain view of a sample holder constructed in accordance with the invention which fits into the guiding slot in the housing.

Under the control of analog signals from CPU 62, the intensity and duration of the light output by the LEDs 64a, 64b is controlled. Likewise, photo detector 68 receives the light reflected from the sample as an analog signal which is received by CPU 62 formatting by an analog to digital converter within CPU 62. Four position indicators 18a–18d are provided within guiding slot 11 along the travel path of the base member 25 through slot 11. FIG. 1 and FIG. 2. Each of these position sensors is an IR interrupt sensor as is known in the art and provides an input to CPU 62 to determine the presence or absence of a sample at each position corresponding to position sensors 18a–18d. Based upon these detection signals CPU 62 determines which sample well is at which position. Alignment sensor 18e may be used to confirm that the sample holder 14 is accurately positioned. Position sensors 18a–18d indicate to CPU 62 which of LEDs 64a and 64b should be illuminated. In a preferred embodiment however, alignment sensor 18e is omitted. A reset assembly 65 disposed in CPU 62 unit is used to initiate the unit.

CPU 62 operates under the instruction of a serial EEPROM 73 coupled thereto. It also provides for auxiliary input/outputs (I/O) 72. The auxiliary I/O is a 9-pin serial port used in the calorimeter for the detection of the status of the stained samples, and as a printer outlet for printing of the data obtained. LCD display 74 is driven by CPU 62. In a preferred embodiment, the CPU combines in a single chip the functions of program ROM memory, A/D and D/A converters, serial I/O (for printing or for external computer), internal RAM memory and central processing unit. Its ROM is loaded with the controlling program, and the CPU 62 accordingly receives information from the position detectors 18a to 18d and the photo detector 68, and directs signals to the transistors controlling the LED current, the LED illumination resistor net, the LCD 74, the detector 68 and the serial I/O port.

During operation, holder 14 is slid into guide 11. A ball and spring detector 18a mates with the first notch 15a on the specimen holder 14. Position sensors 18a to 18d confirm the specific position of the specimen holder 14.

The position sensors are preferably infrared (IR) interrupt sensors, which detect how far the sample holder 14 has been pushed into the guide slot 11 (more exactly, whether a particular sensor has been interrupted or not). CPU 62 notes which position sensors are interrupted, and thereby derives which well is being illuminated. In one embodiment, alignment sensor 18e confirms that each well is accurately in position before illumination. In a preferred embodiment, the ball and spring index alone provides satisfactorily accurate positioning of each well. Each well is illuminated for a brief duration by LED 64b followed by illumination for a brief duration by LED 64a. The signals from detector 68 corresponding to these two illuminations are stored by the CPU. Therefore at the end of the data acquisition an array of two measurements (red and green) for each of the 4 wells, plus two background measurements of the intensity with no sample holder present, have been made (10 measurements in all). At the end of data acquisition CPU 62 compares the detected test sample intensity with that of the difference between the detected standard intensity sample and the detected full-scale intensity, in order to derive the sample concentration compared to the standard concentration. Each measurement is therefore a relative measurement in which the sample is compared with the standard material.

In one embodiment, sample holder 14 is introduced into the reader through slot 11 after loading the wells 16a to 16d with the appropriate samples and staining solutions. The holder is pushed in until it reaches the first position, defined by the ball and spring locking into the holder notch 15a opposite well 16a. At this point the green light 13b on the outside of housing 100 turns off and the red light 13a turns on, to indicate that the holder must not be pushed in further. A message "MEASURING" appears on the LCD screen 12.

As soon as the measurement of well 16a is complete, the red light 13a turns off and the green light turns 13b on, and the holder 14 is pushed into the next notch 15b, corresponding to the next well 16b. The lights turn on in sequence as above. The operation is repeated until the fourth position 16d is reached. At this point, CPU 62 is programmed to compare the test sample of interest with the standard and full scale results to calculate and present the results of measurements on LCD screen 12.

The present calorimeter can thus detect the red or blue stain by measuring whether the signal in well 16a is green or red respectively as function of the intensity of light reflected from respective red and green LEDs. Furthermore, in situations when a well is not properly loaded, the erroneous placement or loading is detected when the signal exceeds that from well 16b which is the no-dye sample.

The rapid 10–20 MHz CPU allows LED luminosity to be set to an optimum value through feedback adjustment.

Figure 3:
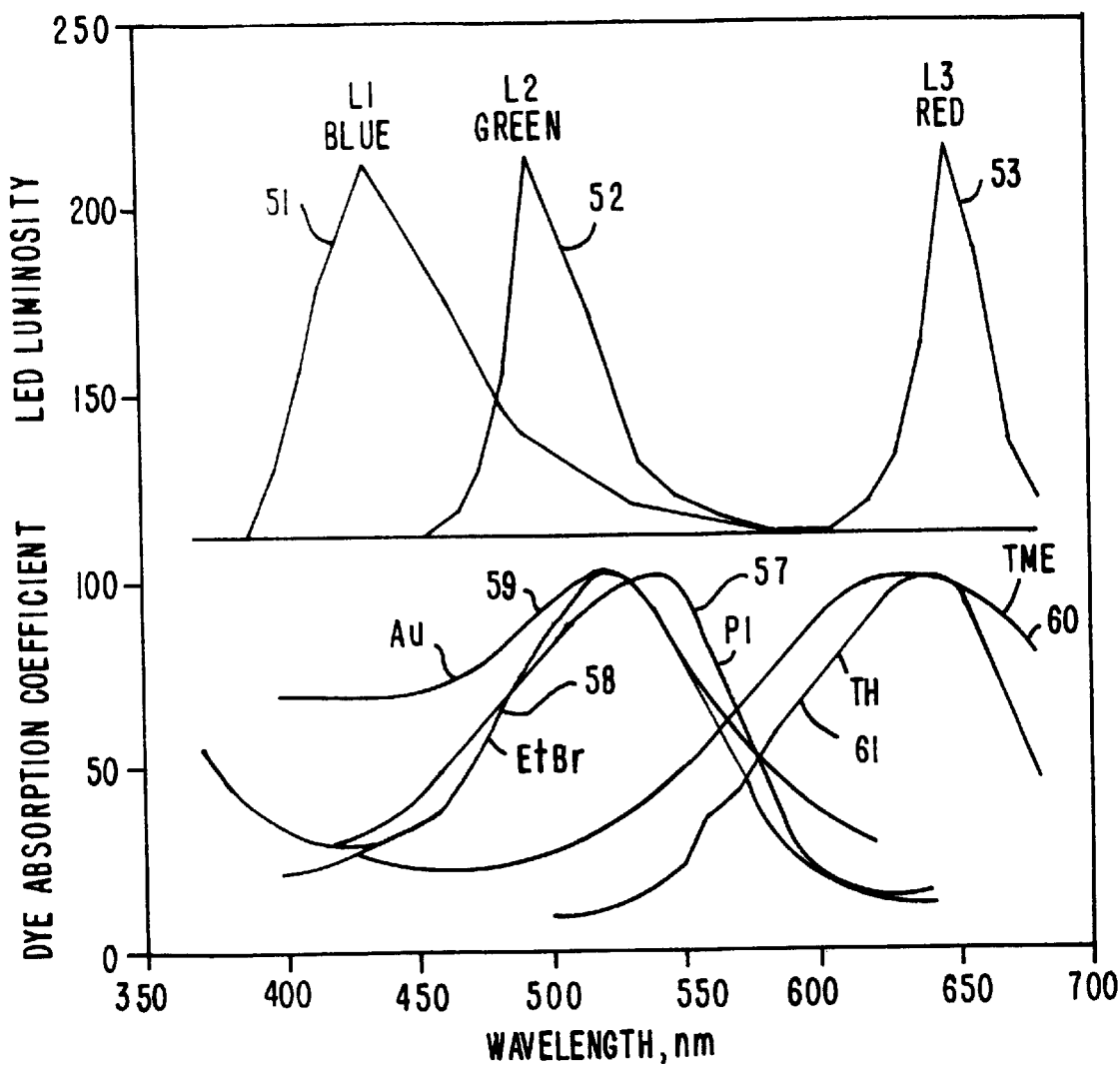
FIG. 3 is a comparison graph of normalized LED output spectra and normalized dye absorption spectra.

Samples 70 disposed within wells 16c and 16d are stained in preparation for analysis. The light absorption characteristics for the more commonly used dyes are known as shown in FIG. 3. A simple handy embodiment of a MARQ reader is provided which uses LEDs to detect absorption in the red and green wavelengths, corresponding to stains that are visually blue and red respectively. High-intensity red LEDs can be used for detecting absorption in the red by blue/green dyes. The combination of red and green LEDs allows both spectral regions to be assayed. Intense LEDs have been developed with wavelengths between 550 and 750 nm (Hewlett Packard, Toshiba or Cree) as well as the GaN LEDs radiating in the blue and green wavelengths, covering most of the spectrum. In the calorimeter, LEDs are selected to optimize the match to the stain dye. Typical normalized emission spectra (blue, green, and red) from standard LEDs L1, L2 and L3 are shown in FIG. 3.

Also shown are normalized absorption spectra for the red dyes propidium iodide 57 and ethidium bromide 58 for DNA determination, and colloidal gold 59 for antibody reactions. The absorption peak for propidium iodide 57 is in the green region near 520 nm. The spectra for the blue dyes peroxidase stain tetra-methyl benzidine +$H_2O_2$ 60 for leukocytes and thiazine blue 61 for low-level DNA assay are also shown, with absorption peak in the red near 640 nm.

For the male assisted-reproductive quality (MARQ) assay, red and green LEDs are used. The effective optical absorption coefficient is proportional to the correlation integral of the emission intensity over the absorption spectrum. The significant overlap between red LED type L1 emission and peroxidase 60 absorption means that absorption characteristic 60 indicating thiazine is easily measured by absorption of the light from LED L (64a). Similarly, propidium iodide, ethidium bromide and colloidal gold are measured as a function of absorption in green wavelengths from LED L2 (64b). The available LED optical output provides enough signal for simple silicon detector measurement. Accordingly, by using two LEDs 64a, 64b of red and green light respectively and monitoring the absorption characteristics with detector 68 it is possible to determine the stain results of an assayed sample by referencing characteristic signals such as 57 to 61 stored in CPU 62. The high intensity and pure color of LED sources used in the inventive colorimeter avoids the need for calibration, expensive diffraction grating, filter sets and photo-multipliers generally used in available calorimeters in the art. Instead the LED source is combined with silicon diode detection under controlled conditions, and the results are analyzed by microprocessor 62. This enables a much needed handy, and very inexpensive system to be built.

Furthermore, a given LED maintains its spectrum constant and its output unchanged within a few percent for thousands of hours at constant current. For a given LED and specified dye, the effective absorption coefficient is constant, and the amount of light absorbed depends only on the total amount of dye present. In the inventive calorimeter, the LED is calibrated on each measurement and the relative reflectance is derived in order to eliminate any variation in optical intensity. The colorimeter MARQ reader makes an instantaneous measurement of the relative reflective light (inverse of absorption), in either of two colors, which is directly dependent on the stain intensity on the sample. More colors covering the entire spectrum may be built into the system for a wide range of tests. The color measurement is output to liquid crystal display 12 (LCD), and communication to an external computer or a printer is available through a RS-232 port 72. FIG. 5.

During a given run the LED intensity is kept constant. The LED intensity is checked at the end of the run, in preparation for the next run. The value of the LED intensity is set through a resistor network. It is adjusted by the CPU so that the reading when the no-dye well (always 16b or well 2) is illuminated, in red and in green, is below 200 on the 0–255 detector scale. This is to ensure that the maximum possible reading from a well does not go off-scale. It is also to ensure that both light sources give similar readings on the no-dye well (maximum brightness) well.

The LED intensity may vary over more than 1 order of magnitude, but the output concentration reading is found to remain experimentally within 1%. The output is a relative measurement and is independent of illumination intensity.

Almost all reflection occurs from the surface of the filter on which the sample rests within a well. The thin layer of stained cells is therefore traversed twice by the light. As discussed above, the first well contains a standard sample and the second well is empty to provide controls. The microprocessor 62 compares the full-scale signal F (second well with no-dye) from detector 68 and standard signal S (first well with standard-dye sample) from detector 68 with a no-sample signal Z corresponding to background noise detected by detector 68 and the signal T from the test sample 70 detected by detector 68. Here Z corresponds to any stray light reaching detector 68, e.g. by reflection off the lens surfaces. Subtracting Z from each signal and using Beer's law for the optical transmission of a layer, the percentage ratio R of the target cell concentration in the sample to the target cell concentration in the standard is given by:

$$R = 100 \cdot \frac{\ln[(T-Z)/(F-Z)]}{\ln[(S-Z)/(F-Z)]}$$

scaled to 100% for sample absorption equal to the standard case. The value of R is transmitted to the LCD display 12 and the RS-232 port 72, available for transmission to a secondary computer. In the low-absorption (linear) regime the above expression simplifies to:

$$R=100 \cdot (F-T)/(F-S)$$

The simplified or the full expression for R can be computed by the CPU 62 with insignificant delay. The output R is a ratio measuring the amount of dye (and hence the amount of cells) traversed by the beam, and will be independent of the absolute value of the LED intensity. A look-up table may be used with the above simplified expression for R to derive cell concentration in reference to the standard.

The quantity R is calculated without reference to outside values, since it is essentially a reflectance ratio. It is therefore virtually independent of the absolute intensity of the illuminating source. R is approximately the ratio of the test concentration to the standard concentration, so that knowing R and knowing the standard concentration determines the test concentration which indicates the occurrence or absence of the desired result. A look-up table may be applied to the values of R in order to derive concentrations.

The particular look-up table used depends on which test is being performed. This may be determined either by the color of Well 1 or by a bar code to be mounted along the side of the cassette readable by CPU 62 as is known in the art and discussed below.

This arrangement provides a concise package and minimizes the number of accurately positioned optical components required. The amount of illumination should be entirely adequate to allow the loss of the outer part of the available LED beam, since there is a large signal available [estimated below].

LEDs are now obtainable with intensity I≈1 candela, emitting over a half-angle of 6°. For the optical system of FIG. 3 the aperture subtends a half-angle θ at the source, and light power incident on the sample would be approximately:

$$P = \frac{\pi I \Omega^2}{673k} \text{ watt}$$

where k is the photopic efficacy of the eye, and in the green k=1(max. value), so the power will be a minimum. The sample will scatter the radiation in all directions. A fraction depending on lens numerical aperture (NA) will be captured and focused on to the detector. Using a light collecting lens with numerical aperture NA=0.5, and writing the sample's effective isotropic reflection coefficient as r, this would result in a minimum flux on the detector:

$$F \approx \frac{r}{15} \frac{\pi I \Omega^2}{673k} \text{ watt}$$

Here r combines all constant geometric factors and depends only on beam absorption in the specimen.

The LED light delivered is limited by the mirror aperture of mirror 69. In a preferred embodiment the aperture subtends 4° at the LED, allowing a cone of light with half angle θ=2° to proceed to the target. The light scattered diffusely by the specimen is focused on to a Si diode detector 68, where green light generates approx. 0.25 A/watt of signal. In a preferred embodiment detector 68 is an Si diode detector. The diode sensitivity is maximum in the red and decreases toward the blue. Consequently green light scattered with no loss (r=1) from the specimen would produce more than 90 nA signal current, and red light will produce a higher signal. This signal is easily amplified without significant noise. It is expected that values up to 90 nA reflected signal in the green from samples with varying degrees of absorption, allowing determination of r, from which R is derived. The coefficient r will be proportional to the transmission coefficient of the specimen, and therefore to the density of the targeted cell. Amplification of such large signals can be done with insignificant noise.

CPU 62 has a built-in 8-bit analog to digital [A/D] converter [scale 0–255], allowing relative signal error theoretically less than 0.5%. Increased resolution is available at virtually no extra cost using 10 bit A/D converters [scale 0–1023].

An advantage of the type of illumination used in this device is that LEDs can be turned on and off [strobed] in less than a millisecond. The detector can similarly be strobed. Moreover, the diode and the A/D circuit of CPU 62 forming the detection circuitry can "settle down" to a constant reading in similar short times. The CPU 62 can be programmed to flash on LEDs 64*a*, 64*b* for the exact duration required, while the detector is gated on simultaneously. The normalized concentration percentage ratio $R_i$, with subscript i representing color, can therefore be determined rapidly (in effect, simultaneously) at more than one wavelength band. If only two dyes of known absorptance are present, their concentrations may be determined. This is of interest for any dual-dye staining test, for example in analyzing sperm for fertility potential. Stains may consist of mixed anti-glutathione peroxidase (bound to yellow particles) and anti-superoxide dismutase (bound to blue particles) (Alvarez, J. G. et al., 1997, Am. Soc. Andrology meeting, Baltimore Md.). Under white light the resultant color may be yellow, green or blue, providing information on the potential of the sperm. This can be analyzed numerically by the bi-color LED system, by selecting colors which are absorbed by the two dyes.

The simplest multicolor analysis occurs for mixed dyes with "orthogonal" absorption spectra, those whose absorption curves do not effectively overlap. The blue and red stains shown in FIG. 3 are effectively orthogonal. Time resolved illumination by appropriate LEDs with similar orthogonal emission spectra then gives independent signals, each proportional to the concentration of only a single dye, respectively. Although in general the dyes do not have exactly orthogonal spectra, deriving the concentrations is still possible.

Robustness against defocus and against non-uniform distribution defocus is also provided by calorimeter 10. The signal must depend only on the amount of targeted cells in the specimen. Intensity dependence on the focal [z-] position of the sample holder must be minimized. In the coaxial design of FIG. 4 the intensity reading can be maintained uniform over a large range of focus by using a sufficiently large-area detector, so that all the light is captured even if the image is slightly blurred. It is expected that the z-position can be maintained within 250 μm. The design should therefore be robust against defocus.

The sperm are deposited on the filter in the well, and in general their surface concentration across the filter will be stochastic (following a Poisson distribution). It might be expected that the details of the distribution would affect the reading of the present device, that intensity would depend on the sperm surface distribution. However, for a given cell staining level and cell concentration, in the relatively low optical absorption regime (far from saturation), the effective reflection coefficient will reduce to a linear dependence on specimen thickness. In this approximation, the attenuation of the whole beam therefore depends only on the total number of cells present on the filter. Provided saturation levels of stain are avoided, the design should be robust against local variations in specimen depth on the filter.

The signal should be relatively independent of local variations in specimen depth provided the specimen target cell concentration is not too high. This is fortunate since it is precisely in the marginal cases that the concentration is low, the signal is high, the isotopic reflection coefficient r is linear with concentration and should be measured correctly. When the concentration is high, the reflected signal is weak, r is logarithmic in concentration and the exact value is less important sine the case is diagnosed as non-marginal.

Programming is done initially directly on the microprocessor 62. In a preferred embodiment, the program for sequential operation of the reader will be written in C++, assembly language or a combination of both, followed by compilation. It will be possible to reprogram the system by downloading from another computer through the built-in RS-232 port 72.

A laboratory test of the MARQ reader concept was set up to confirm that the optical intensity available is adequate, and that good discrimination could be obtained. An arrangement similar to FIG. 4 was used, except that the detector was placed near the specimen, without focusing lens 71, where it intercepted light scattered from the specimen. This arrangement is simpler but reduces the available signal from that in the design of FIG. 4.

Figure 6:
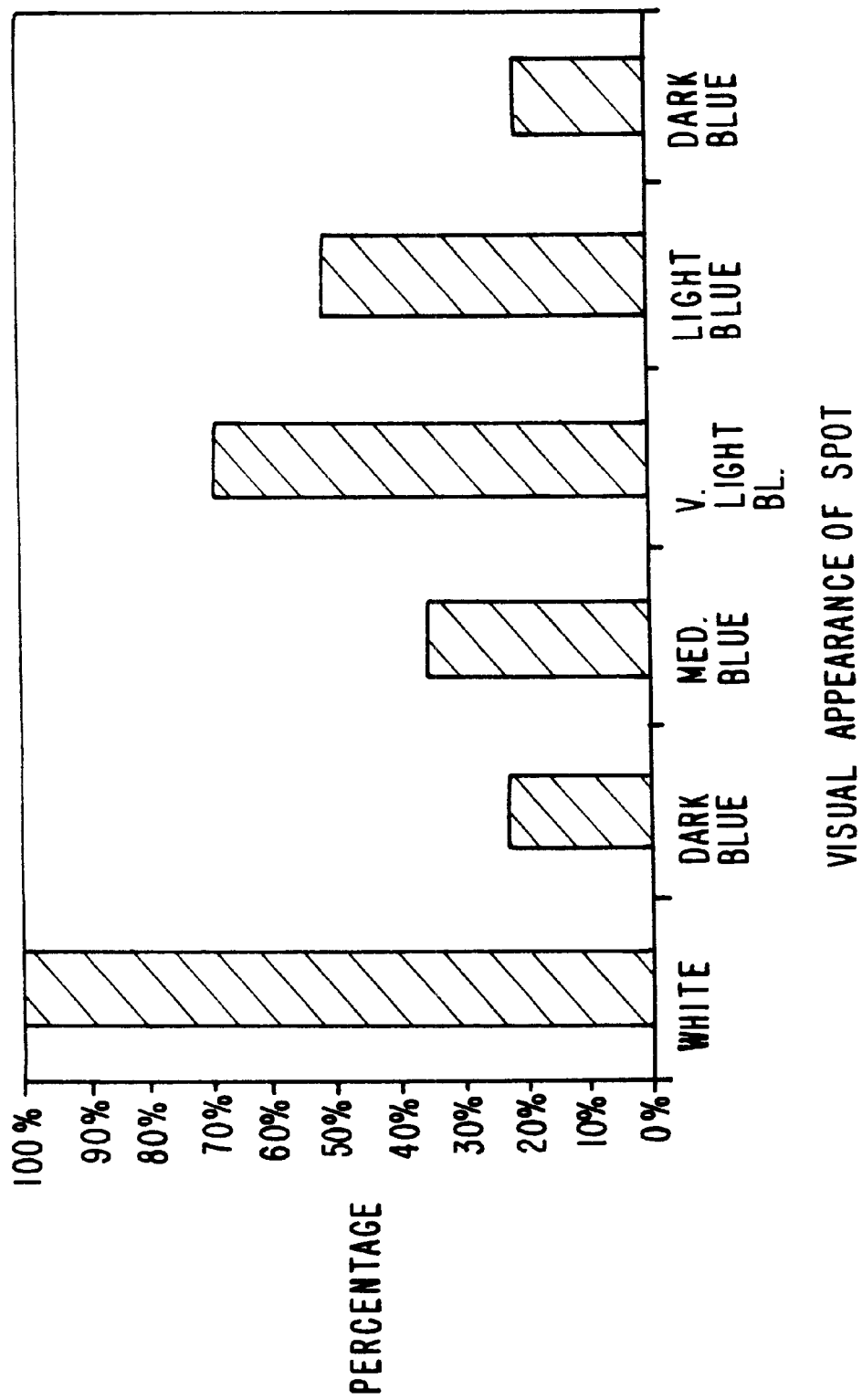
FIG. 6 is a bar-graph showing results obtained for the tetra-methyl benzidine TMB) stain under red LED illumination.

A card containing various specimens of blue and red stains was examined under red and blue LED illumination, respectively. Good repeatability and signal-to-noise were obtained, and the results for analysis using the TMB $H_2O_2$ stain are shown in FIG. 6. Results are normalized as a percentage of the no-stain case, so the first column gives the white (no-sample) reflectivity as 100%, and the qualitative appearance of the sample is given on the abscissa. The five cases shown correspond to different leukocyte concentrations. The measured signal current for the no-sample case, labeled white, was 20 nA. Similar results were obtained for red stains illuminated by blue LED, with lower currents, indicating that available LEDs and detectors can be used to construct the MARQ prototype, with adequate signal over the range of stain intensities expected.

The use of sperm assays was by way of example only the colorimeter may be used to analyze any dyed sample having a known absorption characteristic. It is also contemplated that other light sources will be used to provide for detection of a greater variety of colors allowing analysis for other dyes. A blue light source may be substituted for the red LED or green LED or added to the green and red LEDs as well.

A further embodiment of the invention includes the use of xenon illumination. Xenon illumination is introduced to replace one of the LEDs. The electrical discharge through xenon produces a bright flash of light, and the intensity of the reflected signal is measured by the detector. The xenon flash tube requires additional control circuitry, a power supply and a capacitance, and the discharge is triggered by the same signal as that used at present to power one of the LEDs. Ultraviolet light from the xenon source is used to induce fluorescence in the target. Appropriate filters are introduced for measuring fluorescent intensity.

In yet another embodiment of the invention, a bar code reader is added to identify the sample holder. Bar code reading is enabled by a strip down the side of the sample holder, with an internal bar code reader. This is read as the holder is pushed into the calorimeter, and the identification is used to designate which type of test is to be performed. Since all illumination sources are used on all wells, the test identification instructs the CPU which set of measures to process.

By providing a focusing mirror with an aperture therein light scattering is greatly reduced and complex filters and calibration is further reduced.

It is an advantage of the system that it can select a test automatically by determining whether a red or a blue dye was used, by measuring whether the green or red light signal respectively, is smaller on well 1.

It is a further advantage of the system to report errors and require a re-run when the cassette is not pushed in correctly or if a well is not loaded properly. The loaded well has a reflectivity of only 60% of the unloaded well. Therefore, erroneous placement or loading is detected when any reflected signal exceeds that from the no-dye well 2 or 16b.

In yet another embodiment of the invention the colorimeter MARQ reader is adapted to detect motility of sperm using a single-cell-in-beam assay. The automarqer is adapted to determine the true fraction of motile cells in the sperm sample by counting single motile cells, using total concentration of sperms measured by the MARQ assay. The system is designed to optimize measurement of one cell at a time.

Figure 7:
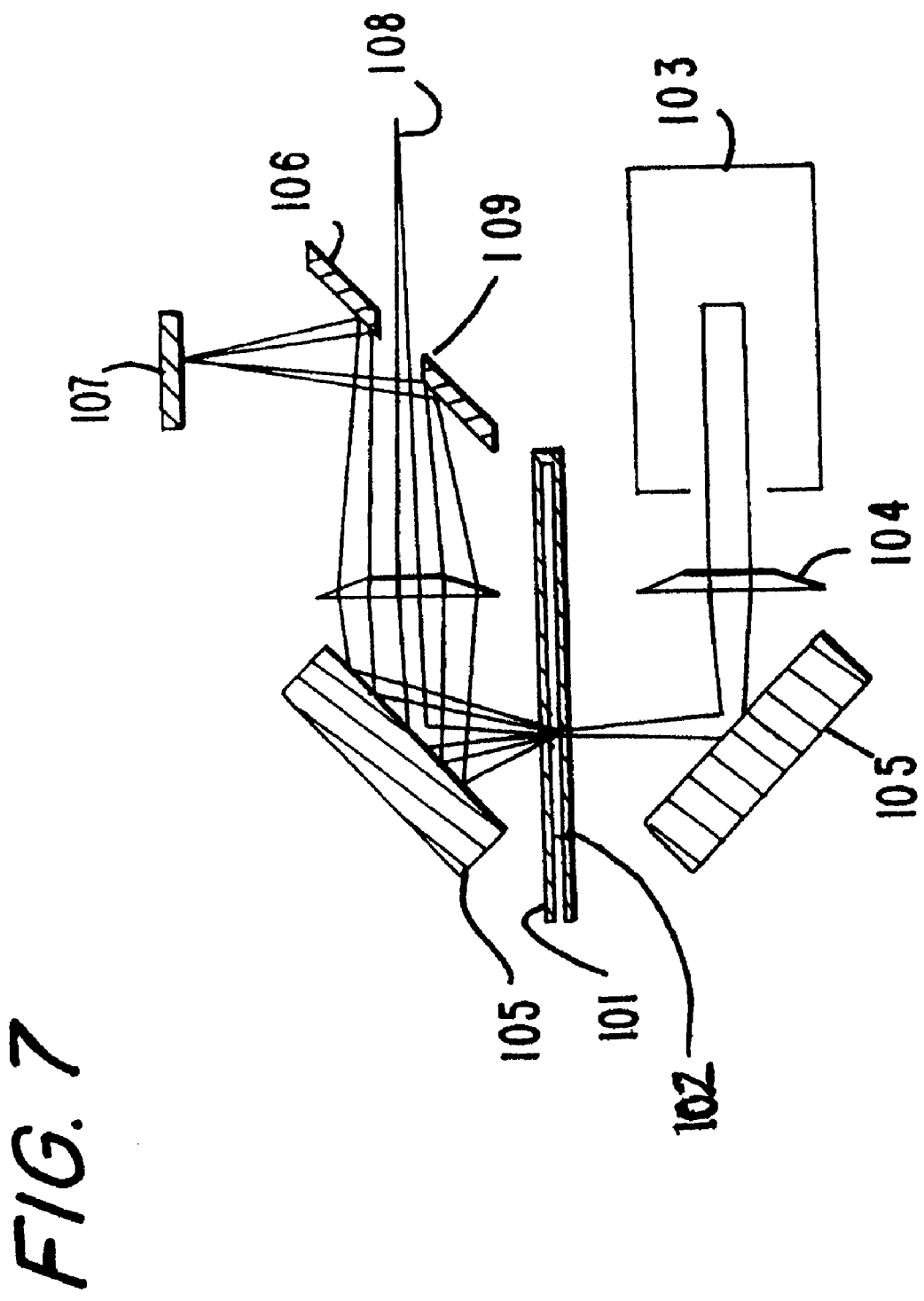
FIG. 7 is a block schematic diagram of the colorimeter using light scattering such as laser light.

As shown in FIG. 7, a modified sample chamber or cassette 101 which is arranged to hold a small microscope slide 102 of fixed chamber depth, allows external illumination from below. Although laser light is not essential, in general, the illumination is from a laser 103. Solid state laser producing diffraction limited TEM00 beams are available from a number of suppliers.

Under typical conditions the laser beam 103 is focused by a condensing lens 104 and a turning mirror 105 on to the sample chamber 101. A focal spot with minimum radius ~10 $\mu$m and focal depth >400 $\mu$m is produced in the chamber plane. Thus, a cell swimming through the illuminated spot scatters the light, some of which is caught on the mirror 106.

Off-axis detection of scattered light is provided by the optics 106 of the automarqer, by allowing light scattered forward by a sperm to be deflected on to the detector 107, while the direct beam 108 is transmitted up the aperture 109 and absorbed.

In general, the cell analysis is most successful using a relatively thin slide, with the chamber depth d equal to 10 $\mu$m to 20 $\mu$m, preferably 20 $\mu$m. Such parameters minimize cell track crossing or cell collisions, while allowing enough volume for the cells to swim unimpeded. Therefore, adding a focused laser to the optical system of the automarqer is the only modification required in this embodiment to permit measurement of cell motility. Thus, the present embodiment includes the optical detector and the amplification circuitry to permit detection of motile cell pulses.

By focusing a light beam down to a small radius, it is possible to illuminate a tiny part of the sample and illuminate only a single motile cell at certain concentrations.

Figure 8:
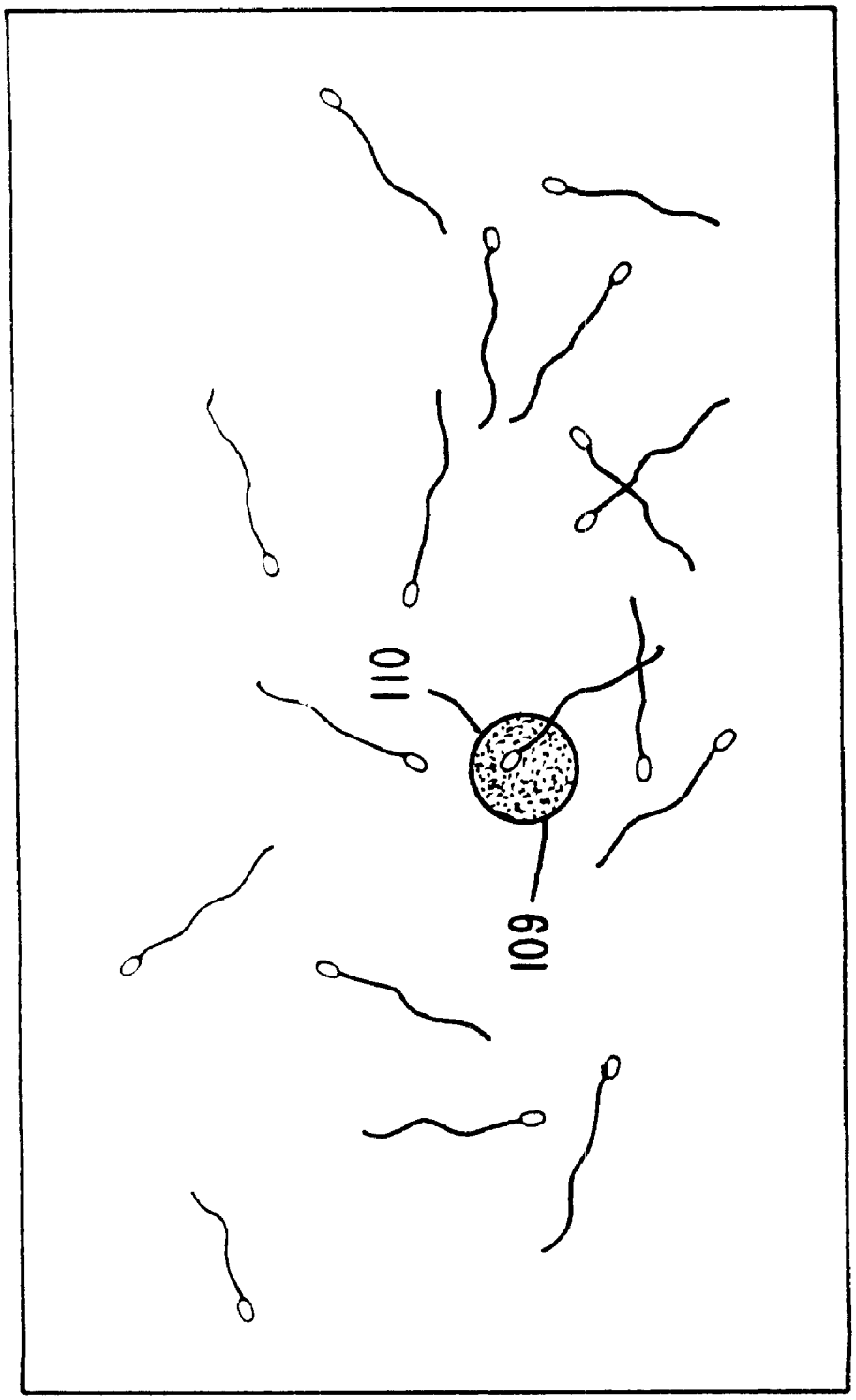
FIG. 8 shows sperms in a specimen chamber. The light beam is out of the paper, with radius r. Only sperm moving into the circular light beam scatter light which is received by the detector shown in FIG. 7.

As shown in FIG. 8, light 108 illuminates a single motile sperm 110, resulting in scattered light fluctuating, indicating a motile sperm in the beam. On the other hand, light scattered from a static sperm does not fluctuate at all or does so very slowly. Thus, by counting the number of scattering events a mean frequency of sperm entry into the beam per unit time, is determined. This frequency depends on the mean sperm density and the mean sperm velocity of motility. If the mean velocity is known, a measure of the motile cell population is obtained, as outlined below. Thus, this method does not need analysis of the detailed scattered signal, but instead detects the presence of a scattering event and its duration. The method of the present invention requires one cell in the beam at a time and therefore the probability that two or more cells enter the beam must be minimized or compensated for.

Figure 9:
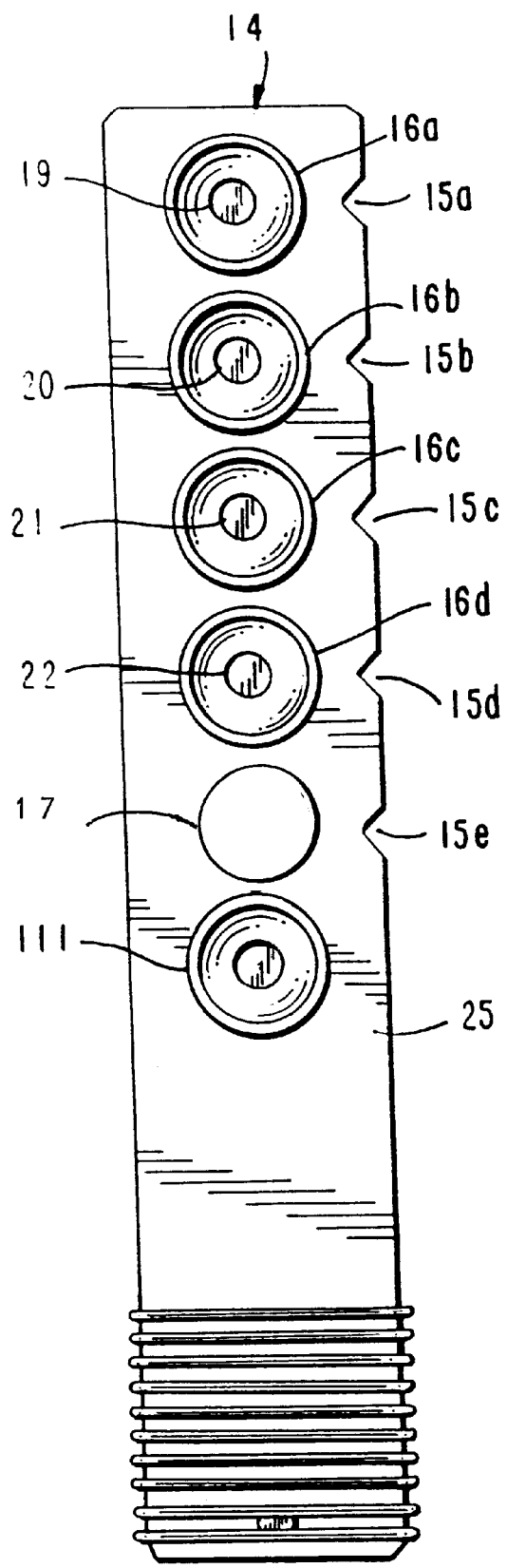
FIG. 9 is a top view of the sample chamber.

FIG. 9 shows a modified sample holder or chamber which properly positions a specimen below the beam.

A 20 $\mu$m deep microscopic slide (2-XL, Hamilton Thome Research, Beverly, Massachusetts) is adapted to provide a chamber which loads by capillary action. The vertical position of this chamber in the cassette is maintained within tolerance 0.010 inch, keeping the chamber within the minimum-radius part of the beam. Therefore, in addition to the 4 wells already present in the cassette 19, 20, 21, and 22, a fifth well 111, contains the entry to a capillary-loaded slide with a 20 μm chamber depth. An aperture 17 is illuminated from below by the laser beam and scattered light from it is directed on the detector, as described above.

Sperm in an observation chamber behave analogously to molecules in a two-dimensional gas. The sperm may be approximated as moving in random directions and with an approximately Maxwellion velocity distribution. If a sample contains N motile sperm per ml, and is placed in a chamber of depth d, then the number of motile sperm per unit area is n=Nd. The chamber is illuminated with a beam of light of radius r [the laser beam intensity is itself a Gaussian function of radius from the optic axis, and r is the radius at which the intensity falls to $1/e^2$ of the peak intensity]. The number of sperm v entering the beam from any direction per second is then approximately:

$$v = 2\ ncr$$

where c is the mean sperm velocity. Therefore if there is only one sperm in the beam at any time, counting the number of sperm scattering events v per unit time gives the product of the density and velocity: nc=v/2r.

The laser beam is typically of Gaussian cross-section, both in the beam leaving the laser and at its focal point, so that the sperm swims into a beam whose intensity increases as the sperm approaches the optic axis. The peak scattered light intensity therefore corresponds to the sperm "impact parameter", the minimum distance from the sperm to the optic axis (center of the beam). It is a convenient property of the Gaussian distribution that the physical distance between the half-intensity points is $r\sqrt{2\ln 2}$, independent of the peak intensity. The intensity of the light scattered from the sperm as it moves across the beam will itself approximate a Gaussian in time, and the physical distance between the points corresponding to the half-peak intensity will be independent of the peak, i.e. independent of the sperm impact parameter. Therefore the mean time τ taken to cross this known half-intensity physical width can be used to derive the mean sperm velocity. It is to be noted that since there is a higher probability of rapid cells crossing the beam than slower cells, the mean velocity of cells crossing the beam will be higher than the mean velocity of all cells in the sample in the proportion 4/π. A correction factor is therefore applied to derive the mean velocity, which becomes c=0.925 r/τ. It is not necessary to measure the crossing time at the mid-intensity level. A running average may be used to provide a smoothed version of the intensity history and the intersection points of the running average may be taken with the actual intensity. By measuring the ratio P between the mean intensity at these intersection points and the peak intensity, the physical distance d between these points may be estimated as $d = r\sqrt{2\ln(1/P)}$ which enables the sperm velocity to be determined. Therefore, the transit velocity of each sperm can be rapidly computed by the CPU.

By measuring the mean velocity from a suitable number of sperm transits of the beam, and by measuring the rate of transits v, the motile sperm concentration is derived from nc=v/2r, as described above.

The present invention minimizes the potential error due to more than one sperm existing simultaneously in the beam. The population of any specific area of the slide will be random, and the probability that any area is occupied by a given number of sperm will be given by the binomial distribution.

The average number of sperm in the beam (and therefore illuminated) is defined at any time as the occupancy, $B = n\pi r^2$. Normally the sperm density n will be large and the beam radius will be designed to be small, so that the occupancy is less than 1. It may be shown that, if the beam area is very small and the sperm density n is large, then the probability P of finding exactly s sperms in the beam at any time is closely approximated by the Poisson distribution:

$$P_s = \frac{B^s e^{-B}}{s!}.$$

It follows that the probability of finding two or more sperm in the beam is $P_{N>1} = 1-(1+B)e^{-B}$, and the ratio of the probability of finding more than one to the probability of finding one sperm may be termed the occupancy error:

$$R = [1-(1+B)e^{-B}]/Be^{-B}.$$

For practical purposes, note that if the occupancy is B=0.2, then the probability of finding 1 cell in the beam at any time is $P_1 = 0.164$, and the occupancy error is about R=11%. So multiple-occupancy becomes a significant source of error for B>0.2, defining an upper limit to the occupancy as described below. A correction factor can be applied if to compensate for multiple occupancy.

Figure 10:
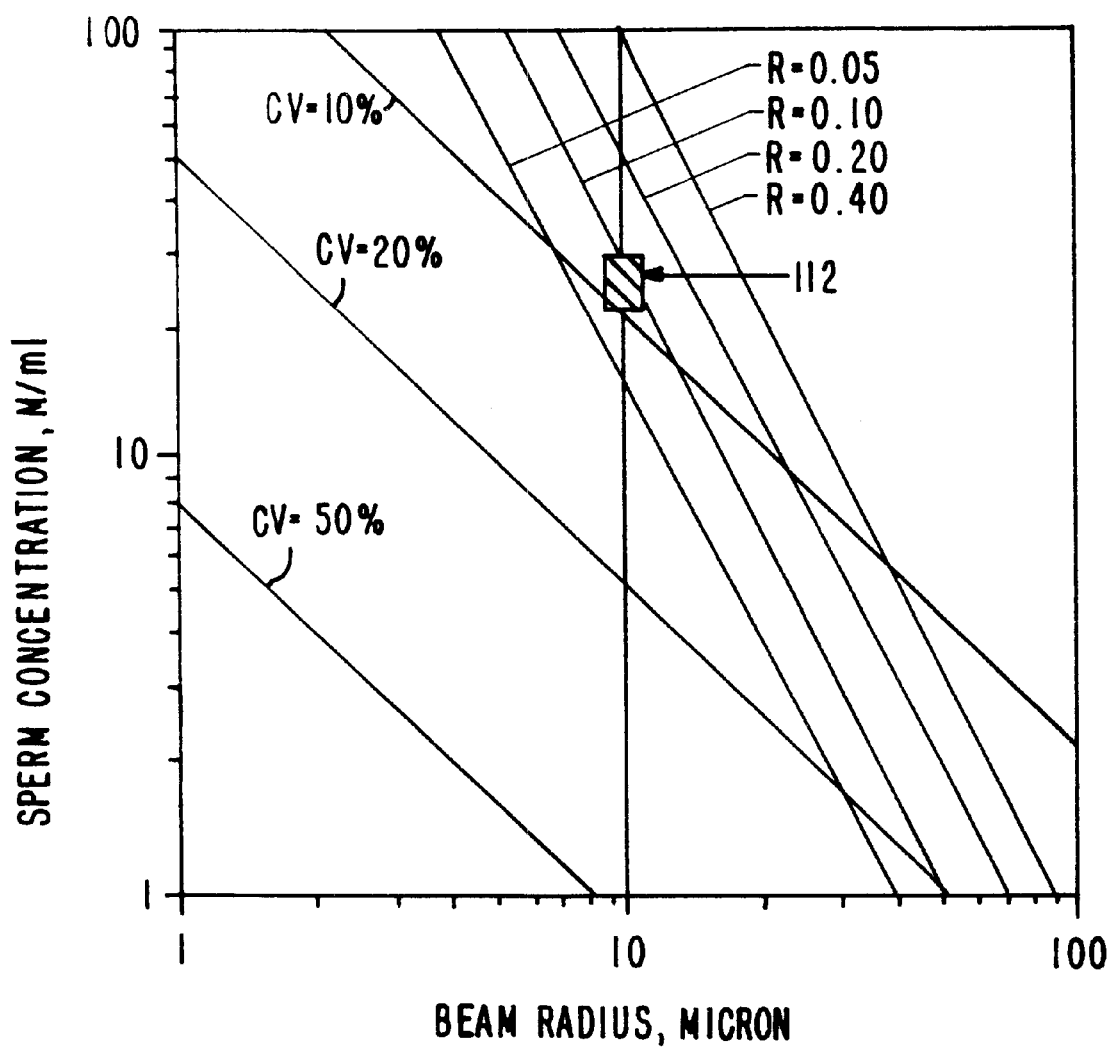
FIG. 10 is a graph depicting the accuracy of simulated motility measurements. The operating regime for the single-cell scattering system is with depth d=20 $\mu$m. Occupancy error and counting CV are shown.
Figure 11A:
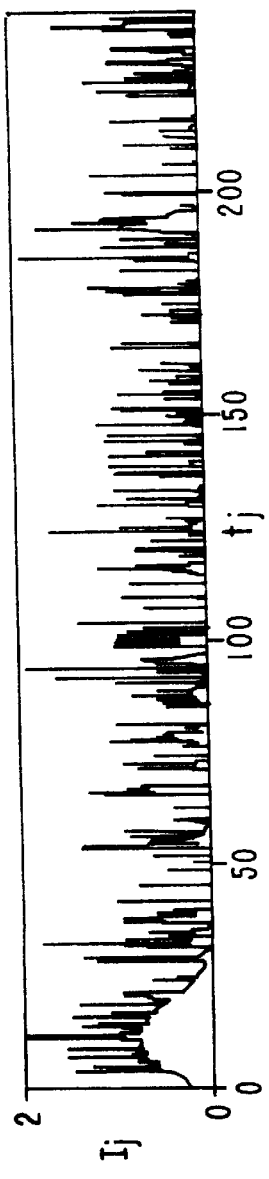
FIG. 11 is a diagram of 4 traces (a–d) of the signals obtained from 50 M/ml motile sperms swimming with means velocity 50 $\mu$m/sec across a beam 10 $\mu$m in radius. Trace a is 240 sec long. Traces b–d are at longer time scales.
Figure 11B:
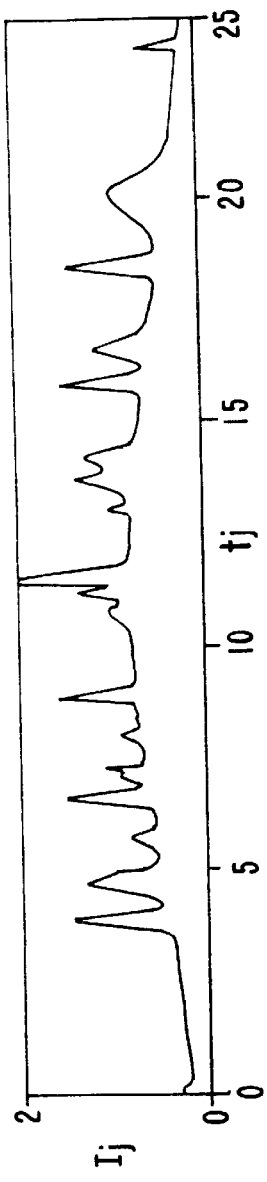
Figure 11C:
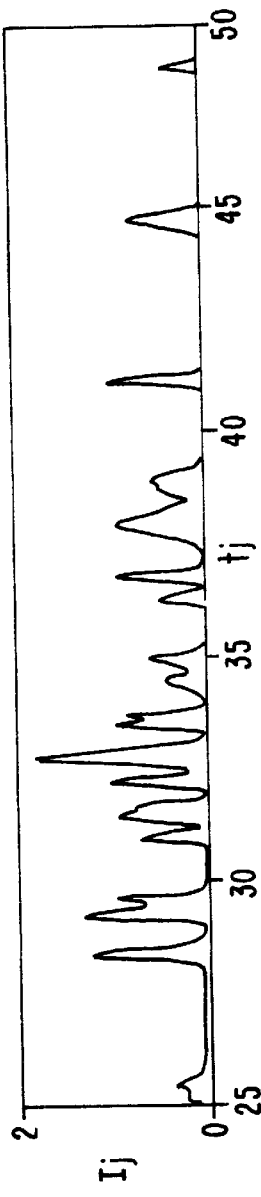
Figure 11D:
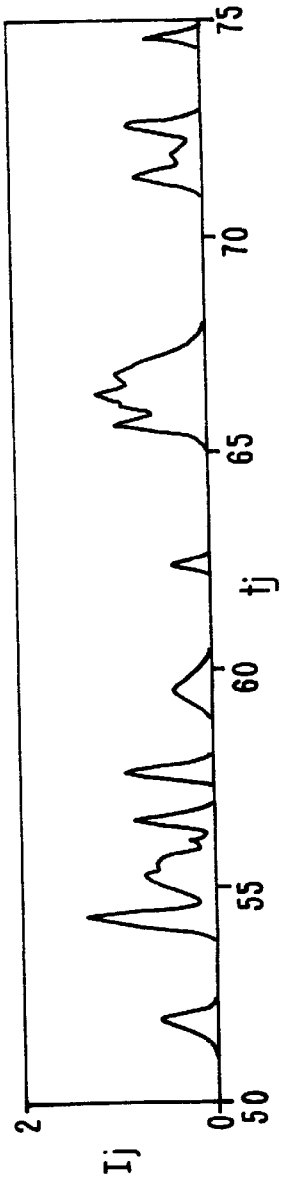

In a clinical laboratory, technician hands-on time loading the cassette into the MARQ reader should be less than 20 seconds. A reasonable time in a clinical practice for the (unattended) instrument to measure motility is τ=4 minutes. The number of cells counted in time τ will be vτ. The associated coefficient of variation will be CV=$1/\sqrt{v\tau}$. The CV is shown in FIG. 10, in which sperm concentration N is plotted against beam radius r for a chamber of depth d=20 μm. Also shown is the occupancy error R from the preceding section. Thus, between motile cell concentration 8<N<60 M/ml, errors are less than 20%, and that between 25<N<30 M/ml, the error is about 10%, which is identified as the design point 112. The design point position scales inversely with chamber depth, so that for 10 μm depth chambers, the design point range becomes 50<N<60 M/ml.

Once the motile cell concentration has been determined, the MARQ reader will calculate the motility MOT=(motile conc)/(total conc), using the previously determined total concentration from the VitalMARQ assay.

The occupancy error provides an upper limit to the motile concentration, although this limit is actually higher than described above since correction factors may be applied to the measured count. At low concentration, the number of sperm counted in a given time provides the lower limit. A potential error is caused by detection of a sperm tail in the field, prolonging the measured head transit time, which effectively increases the size of the sperm. In the present method measurement of any part of the sperm except the head is eliminated by an appropriate signal intensity filter, since the head signal will be much brighter than the tail signal in the forward-scattering optical regime used. Sampling error is a potential problem in a heterogeneous fluid such as semen. However, the liquefaction step using chymotrypsin, which does not reduce motility, provides a much more uniform specimen and minimizes the sampling error.

FIG. 11 is a diagram of 4 traces of signals obtained from 50 M/ml motile sperms swimming with mean velocity 50 μm/sec across a beam 10 μm in radius. Trace a is 240 sec long. Traces b–d are the same trace expanded to shorter times.

In order to perform a validation or test of the accuracy of the system, ideally one would like to know the velocity, initial position, direction of motion and motion parameters such as lateral head displacement and beat cross frequency, which represent size and frequency of the sperm head oscillation. The results which should be obtained from the reader would then be known and would be compared with the actual results obtained.

It is not possible to know the velocity and trajectory of every sperm crossing the beam when performing a validation test. However, it is possible to simulate sperm trajectories, allow many simulated trajectories to occur, and then produce an equivalent signal stream. The signal stream will be closely equivalent to that obtained when sperm swims across a laser beam and scatter light, but with the added advantage that each "sperm's" motion parameters will be exactly known. Detailed comparison can then be made with the known input and the analyzed output conclusions.

An example of such a signal stream is shown in FIG. 11. Fictitious "sperm" of known (randomly assigned) initial position, velocity, ALH, BCF and impact parameter moved on their trajectories across the beam, represented as a gaussian intensity field, producing scattered light depending on their distances from the optic axis. FIG. 11a shows the output signal over 240 seconds. FIGS. 11b, c and d show the same signal on an expanded time scale, so that details are more evident. It can be seen that the trace consists of a number of peaks of random height and position, sometimes separate but frequently superimposed. Each peak represents a sperm crossing. The probability of simultaneous sperm crossings is given by the Poisson distribution discussed above. This can be used to determine the actual number of sperm crossing from the apparent number given by FIG. 11, and by measuring the apparent crossing velocity determine the average velocity and therefore the sperm concentration.

Figure 12:
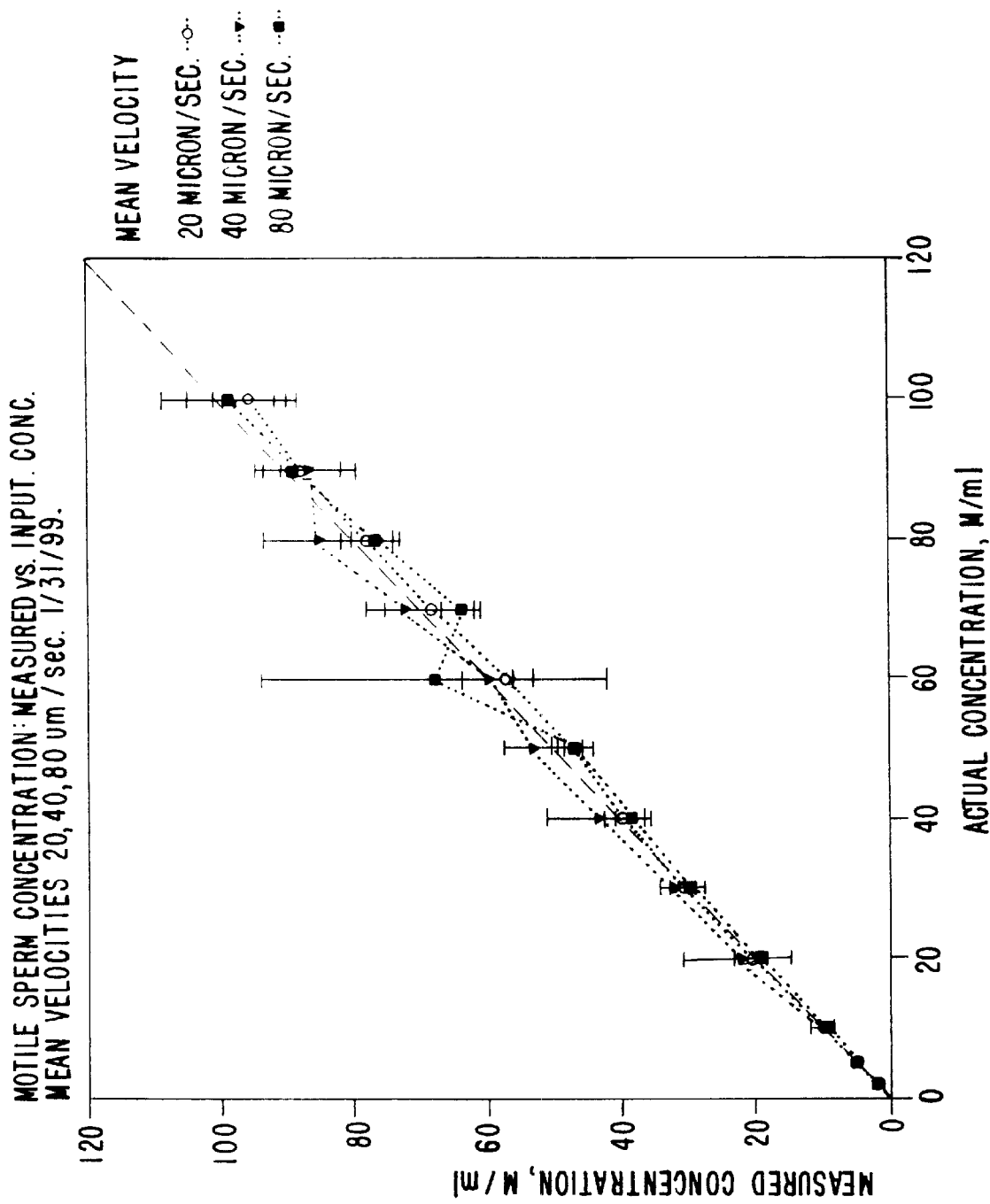
FIG. 12 describes a comparison of known sperm concentration and velocity and that derived from analyzing the output trace.

Comparison between the known "sperm" concentration and velocity and that derived from analyzing the output trace in this way is shown in FIG. 12. In this case, the trace is 150 seconds long. At low sperm density the Poisson correction is negligible, but at high density it varies between 30–80%. It can be seen that the agreement between the input concentration and the corrected concentration obtained from analyzing the trace is good for the range of concentrations and mean sperm velocities used.

The CPR used for this calculation is a RISC based high-speed unit capable of performing the required calculations on-line and in real time.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, must be said to fall there between.

What is claimed is:

1. A color measurement apparatus for determining the color composition on a specimen having an exposed surface, the apparatus comprising:

a first light emitting diode for producing light along a light path illuminating the specimen with light;

a sensing means along the light path for receiving light reflected from said specimen and producing a detection signal representative of the intensity of light reflected from the specimen in response thereto;

a mirror, elliptically shaped and having an aperture disposed therein, placed along the light path for focusing light reflected from the specimen and directing the reflected light to the sensing means; and a processor for receiving the detection signal and determining the characteristic of the specimen in response thereto, by strobing the light source and a detector simultaneously.

2. The color measurement apparatus of claim 1, wherein the mirror consists of a dichroic mirror.

3. The color measurement apparatus of claim 1, wherein the specimen comprises semen.

4. The color measurement apparatus of claim 1, wherein the processor determines the characteristics as function of the ratio of the detected value of light reflected from the specimen and a standard value.

5. The color measurement apparatus of claim 1, further comprising a cover having a guiding slot for receiving a sample holder therein, and a plurality of position detectors for detecting the position of a sample, and wherein said sample holder includes a plurality of indexes such that said indexes match with the corresponding position detectors in said color measurement apparatus.

6. The color measurement of claim 5, further comprising:

an alignment detector, said alignment detector causing the first light and a second light to fire when a specimen is detected by the position detector, a laser beam focusing on the specimen, and a sensing means including an apertured-mirror optical system to determine the light scattered from the specimen.

* * * * *